Nov. 8, 1949     B. E. HOUSE     2,487,756
INTERNALLY EXPANDING BRAKE
Filed Oct. 30, 1944     3 Sheets-Sheet 1

INVENTOR
BRYAN E. HOUSE
BY T. J. Plante
ATTORNEY

Nov. 8, 1949  B. E. HOUSE  2,487,756
INTERNALLY EXPANDING BRAKE
Filed Oct. 30, 1944  3 Sheets-Sheet 2

INVENTOR
BRYAN E. HOUSE
BY
T. J. Plante
ATTORNEY

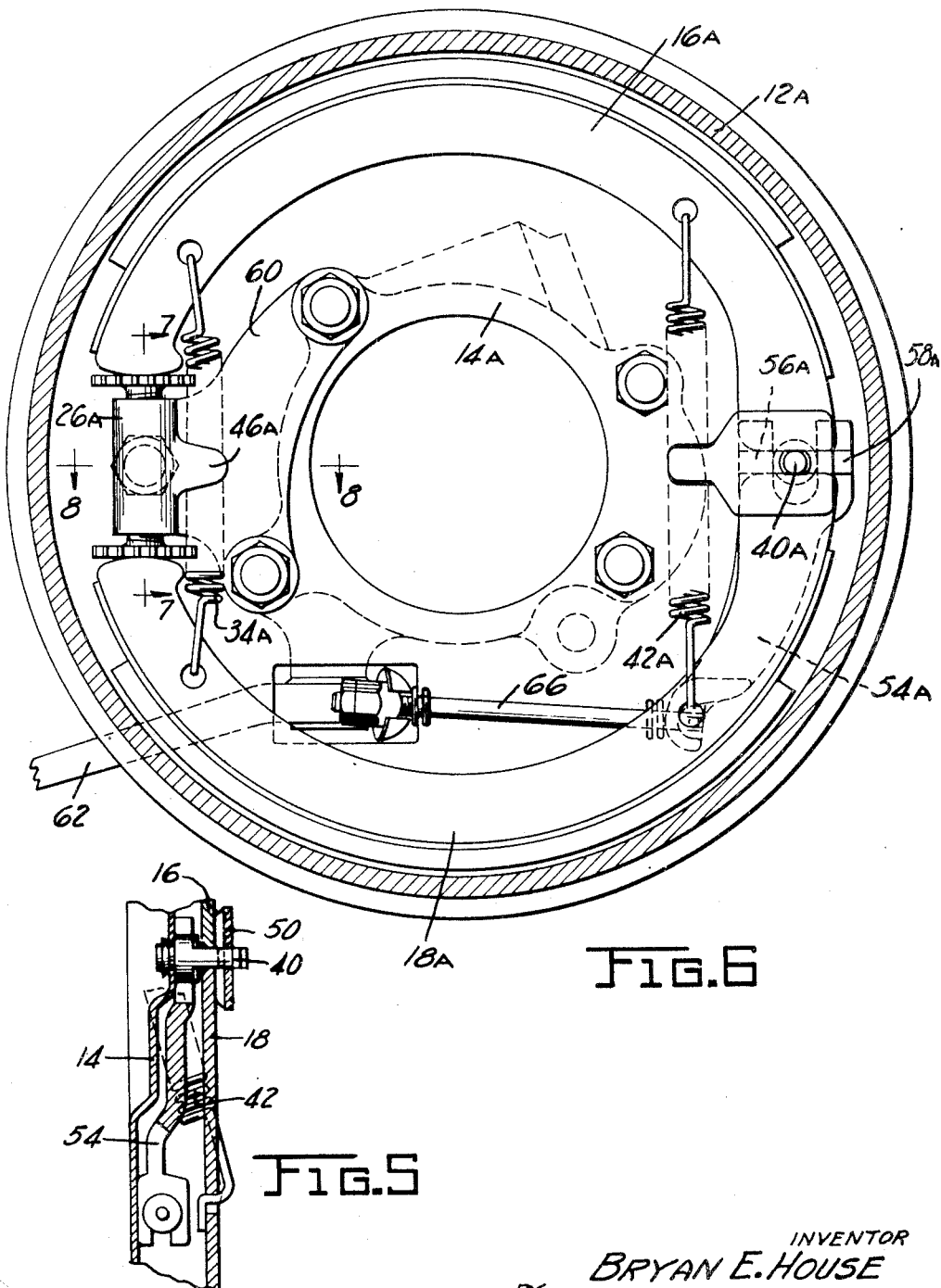

Patented Nov. 8, 1949

2,487,756

UNITED STATES PATENT OFFICE 2,487,756

INTERNALLY EXPANDING BRAKE

Bryan E. House, South Bend, Ind., assignor to Bendix Aviation Corporation, South Bend, Ind., a corporation of Delaware Application October 30, 1944, Serial No. 560,953

5 Claims. (Cl. 188—78)

1

This invention relates to brakes, and more particularly to an internal expanding type of brake wherein two shoes are provided which are permanently anchored at the same side of the brake and which are moved into engagement with the brake drum by a device which spreads the unanchored ends of the shoes, this brake arrangement being commonly referred to as a "non-servo" brake.

The conventional "non-servo" brake has the adjacent anchored ends of the shoes pivoted on anchor pins journaled in the backing plate or support member. Near the unanchored ends of the shoes adjusting eccentrics or cams are provided which are adapted to move the shoes closer to the drum to compensate for lining wear. In order that the adjustment of the shoes provided by the eccentrics or cams near the unanchored ends of the shoes will not throw the shoes out of proper concentricity with the drum, the conventional "non-servo" brake is provided with anchors which are also adjustable, the part of the anchor which extends through the shoe webs usually being eccentric with respect to the part of the anchor which extends through the backing plate. Not only is this structure complicated and relatively expensive to manufacture, but, in addition, the procedure for adjusting the shoes is involved and tedious.

An object of the present invention is to provide a simplified brake of the "non-servo" type, reducing both the cost and weight of the complete brake assembly.

Another object of the present invention is to simplify the adjusting procedure required for adjusting the released position of the shoes of a "non-servo" brake.

Yet another object of the present invention is to provide a brake of the "non-servo" type wherein the shoes are allowed to center themselves during braking, thus preventing loss of effectiveness on the one hand and uncontrollability on the other.

Figure 1:
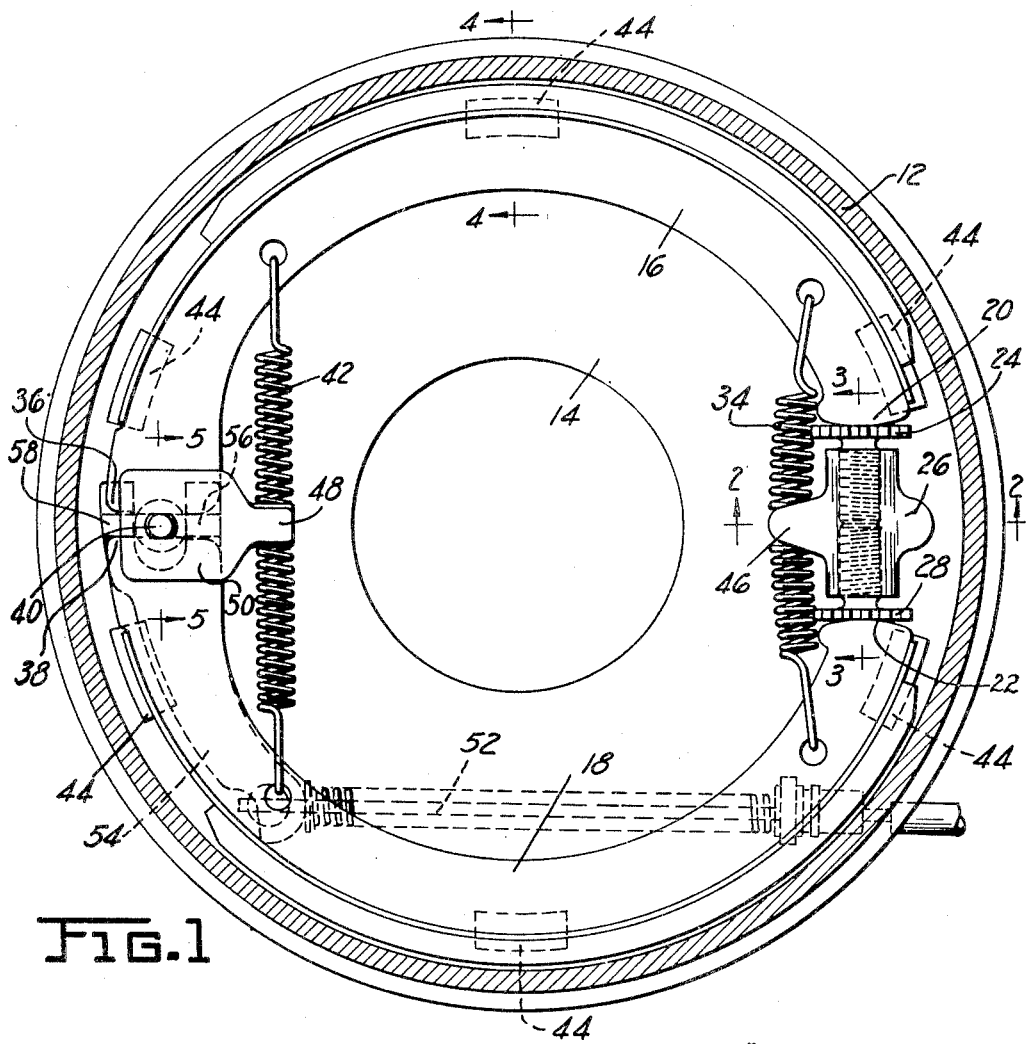
Figure 2:
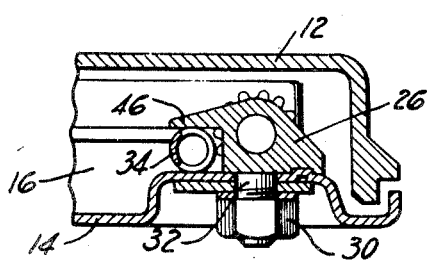
Figure 3:
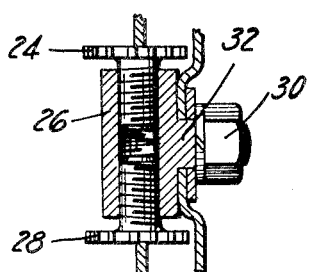
Figure 4:
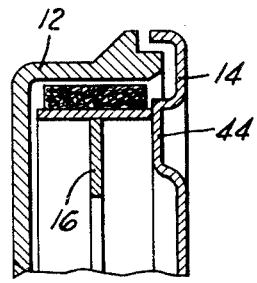

Other objects and advantages of the present invention will become apparent during the course of the following description, reference being had therein to the accompanying drawings, in which:

Figure 1 is a plan view of a brake assembly incorporating my invention, the braking flange of the brake drum being shown in section;

Figures 2, 3, 4 and 5 are sections taken on the planes 2—2, 3—3, 4—4 and 5—5 respectively, of Figure 1;

Figure 6 is a plan view of a brake assembly showing a second embodiment of my invention; and

2

Figure 7:
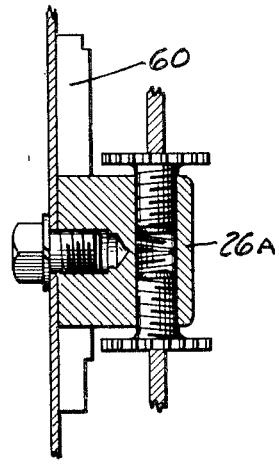
Figure 8:
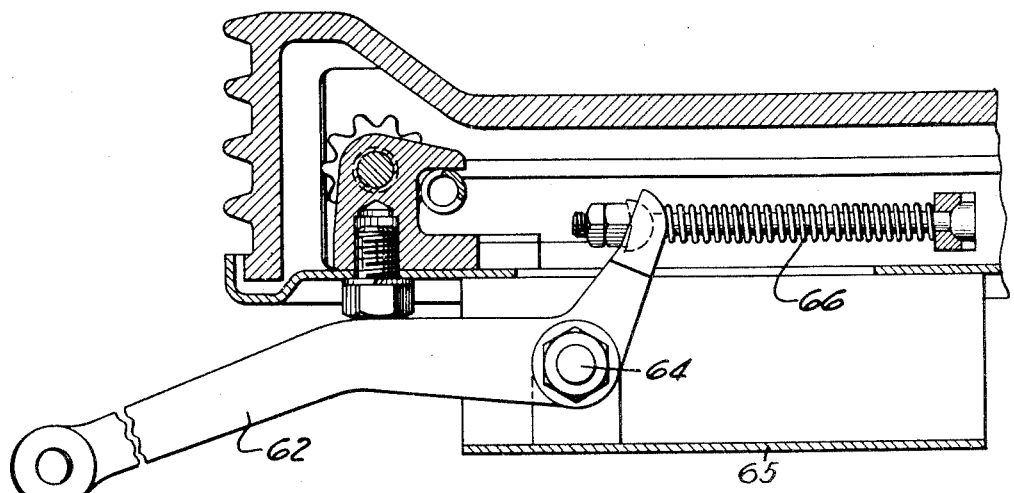

Figures 7 and 8 are sections taken on the planes 7—7 and 8—8, respectively, of Figure 6.

Referring first to the brake shown in Figures 1 to 5, inclusive, it comprises a rotatable brake drum having a cylindrical braking flange 12, a non-rotatable support member or backing plate 14 mounted on a fixed part of the vehicle, and two arcuate lined brake shoes 16 and 18 mounted in end-to-end relationship on the support member 14 and adapted to be expanded into engagement with the drum 12 in order to impede the rotation thereof, each of said brake shoes being substantially T-shaped in cross-section, the stem of the T being provided by the shoe web, and the head of the T being provided by the lined shoe rim.

The end 20 of shoe 16 is maintained in contact with the head of an adjusting screw 24 which is screwed into one end of a bracket 26 mounted on the backing plate 14, and the end 22 of shoe 18 is maintained against the head of adjusting screw 28 which is screwed into the opposite end of bracket 26. The bracket 26 is secured to the backing plate by suitable means, such as the nut 30 in threaded engagement with the stud 32 formed integrally with the bracket (see Figures 2 and 3). The ends 20 and 22 of the shoes 16 and 18 respectively are preferably curved as shown, in order that force applied to spread the opposite ends of the shoes will cause them to rotate about the surfaces 20 and 22 as they move into contact with the drum. Owing to the flat anchor surfaces provided by the heads of the respective adjusting screws 24 and 28, the shoe ends 20 and 22 are capable of sliding outwardly to bring the shoes into full contact with the drum. A tension spring 34 connecting the shoes 16 and 18 near the anchored ends of the shoes, maintains the shoe ends in engagement with the heads of the adjusting screws.

At the opposite side of the brake, the ends 36 and 38 of the shoes 16 and 18, respectively, are normally (i. e., while in released position) maintained against the opposite sides of a flat sided stop member 40 by means of a tension spring 42 connected between the shoes. The sides of stop member 40 are preferably flat as shown, in order that the ends of the shoes may slide along said member to bring the shoes into proper concentricity with the drum. The ends 36 and 38 of the respective shoes serve as pivots for the shoes when the adjusting screws 24 and 28 at the opposite side of the brake are rotated to bring the faces of the shoes nearer the drum to compensate for wear.

By positioning the shoes as shown, with the ends of each shoe on a substantially horizontal line, maintaining concentricity of the shoes is simplified because the weight of the shoes has no tendency to move them into an eccentric position with respect to the drum. The upper shoe 16 rests on the stop member 40 at one end and on the head of adjusting screw 24 at the other end, while the strength of springs 34 and 42 sustains the weight of the lower shoe 18, holding its left end against stop member 40 and holding its right end against the head of adjusting screw 28.

Maintenance of the shoes in the proper lateral position may be accomplished primarily by providing a plurality of upraised ledges 44 on the backing plate 14, and by providing a force which urges the shoes against said ledges. A convenient manner of accomplishing this is shown. An extension or nib 46 an anchor bracket 26 deflects the center portion of spring 34 downwardly, causing the spring to exert a force component holding the shoes against the ledges on the backing plate. At the opposite side of the brake, an extension 48 provided on a plate 50 which is secured to stop member 40 may deflect the center portion of spring 42 in a similar manner. Additionally, the edges of plate 50 may overlie the ends 36 and 38 of the respective shoes to aid in maintaining the proper lateral position of the shoes.

Application of the brakes is accomplished by spreading the ends 36 and 38 of the shoes. In the illustration, this is done by exerting a force through a cable 52 tending to rotate a lever 54 in the counterclockwise direction. This lever is provided with two lugs 56 and 58 at opposite sides of stop member 40 which extend upwardly between the ends of the shoes and exert a direct force tending to spread the shoes, the lug 56 acting against shoe 16, while lug 58 acts against shoe 18. This causes the shoes to pivot about their opposite ends 20 and 22, and move into contact with the drum, the anchoring torque of the self-energizing shoe being taken by anchor bracket 26. In accordance with well known principles, one or the other of the shoes will be self-energizing, depending on the direction of drum rotation, while the other shoe will be a trailing or non-self-energizing shoe. Upon release of the applying force, the springs 34 and 42 will draw the ends 36 and 38 of the shoes back to released position in which they abut against member 40, the shoes during this movement again rotating on surfaces 20 and 22. If, when the shoes are moved into contact with the drum, one of them is not perfectly concentric with the drum, it will be able to slide along the head of the respective adjusting screw to move into full friction contact with the drum.

When it is desired to adjust the position of the shoes to compensate for shoe wear, the shoes are separately adjusted by means of their respective screws 24 and 28. Each screw is turned outwardly until the respective shoe is in full contact with the drum and then is returned a predetermined amount to allow clearance between shoe and drum. If, in adjusting the shoe, one portion of the shoe comes into contact with the drum ahead of the rest of the shoe, the turning of the adjusting screw is continued until the entire shoe comes into contact with the drum, the ends of the shoe being capable of sliding for this purpose. The advantage of this mode of adjustment over that used in the conventional non-servo, from the standpoint both of simplicity and rapidity, should be obvious.

In the conventional double-anchor "non-servo" brake, the anchors are eccentric, and they, as well as the adjustors provided for the purpose, must be adjusted when the clearance of the brake shoes is changed. The adjustment procedure for the conventional "non-servo" brake is as follows. The eccentric anchors are first adjusted by means of a "feeler" or thickness gauge to give a certain clearance at the ends of the shoes adjacent the anchors. The eccentric adjustors near the unanchored ends of the shoes are then adjusted to give a certain clearance at the ends of the shoes adjacent the actuator. However, if, in adjusting the ends of the shoes near the actuator, the clearance at the ends of the shoes adjacent the anchors is made too small, the eccentric anchors will have to be readjusted to increase the clearance. Then it may be necessary to again adjust the eccentric adjustors provided at the unanchored ends of the shoes in order to give proper clearance there.

Not only is the brake shown in the present application much easier to adjust than conventinal non-servo brakes but also it contains fewer parts and is less costly.

The brake shown in Figures 6 to 8 inclusive differs from that heretofore described primarily in the use for which it is intended. The brake shown in Figures 1 to 5 is intended for use at the wheels of a vehicle, whereas that of Figures 6 to 8 is intended for use on a propeller shaft, primarily as a parking or emergency brake. In this embodiment, the anchor bracket 26a is formed integral with a strengthening plate 60 which aids backing plate 14a in supporting the anchoring load. The force for spreading the shoes is applied by means of a bell crank lever 62 pivoted at 64 on the transmission housing 65, as shown in Figure 8. The lever acts through a tension link 66 to move lever 54a in a clockwise direction. In general the construction and operation of the brake illustrated in Figures 6 to 8 inclusive is similar to that shown in Figures 1 to 5 inclusive, and therefore similar parts in the latter embodiment have been marked with the same numerals as the parts in the former embodiment with the addition of the letter "a." It will be noted that, in the latter embodiment, the locations of anchor bracket 26a and stop member 40a are shown exactly reversed from their positions in the former embodiment, and that springs 34a and 42a are at opposite sides of the illustration when compared with springs 34 and 42.

Although particular embodiments of my invention have been described, it will be understood by those skilled in the art that the objects of the invention may be attained by the use of constructions different in certain respects from those disclosed without departing from the underlying principles of the invention. I therefore desire by the following claims to include within the scope of my invention all such variations and modifications by which substantially the results of my invention may be obtained through the use of substantially the same or equivalent means.

I claim:

1. In a brake comprising a rotatable brake drum and a non-rotatable support member having an anchor member thereon, in combination, an adjusting member extending from each side of said anchor member, two brake shoes each having one end thereof in contact with one of said adjusting members, resilient means maintaining the anchored ends of the respective shoes in contact with the adjusting members at all times, but permitting said anchored ends of the shoes to slide along the adjusting members, a positioning member located between the unanchored ends of the shoes and having flat surfaces against which said unanchored shoe ends rest in released position, a free floating lever having two laterally extending lugs, one of which is located radially inwardly of the aforesaid positioning member and which is adapted to contact one of the shoes, and the other of which is located radially outwardly of the positioning member and which is adapted to contact the other shoe, and a tension link for rotating said lever to spread the unanchored ends of the shoes.

2. In a brake comprising a rotatable brake drum and a non-rotatable support member having an anchor member thereon, in combination, an adjusting member extending from each side of said anchor member, two brake shoes each having one end thereof in contact with one of said adjusting members, resilient means maintaining the anchored ends of the respective shoes in contact with the adjusting members at all times, but permitting said anchored ends of the shoes to slide radially along the adjusting members, a positioning member located between the unanchored ends of the shoes and having flat surfaces against which said unanchored shoe ends rest in released position, said adjusting members being adapted to cause pivotal movement of the shoes about said positioning member to bring the shoes closer to the drum, a free floating lever having two laterally extending lugs, one of which is located radially inwardly of aforesaid positioning member and which is adapted to contact one of the shoes, and the other of which is located radially outwardly of the positioning member and which is adapted to contact the other shoe, and a tension link for rotating said lever to spread the unanchored ends of the shoes.

3. For use in cooperation with a rotatable brake drum, a brake comprising a non-rotatable support member, an anchor member carried by said support member having internally threaded openings at opposite ends thereof and having a projection extending from one side thereof, two adjusting screws, each comprising a stem screwed into one side of the anchor member and a head having a flat shoe-engaging surface and a toothed periphery, two brake shoes, each having one end thereof in contact with the flat shoe-engaging surface of one of the adjusting screw heads, a return spring connected in tension between the anchored ends of the shoes and centrally engaging the projection which extends from one side of the anchor member, said projection deflecting the spring to provide a lateral force component acting on the shoes, said spring engaging, at spaced points, the toothed peripheries of the adjusting screw heads in order to restrain them from undesired rotation, and means for forcing apart the unanchored ends of the shoes to bring the shoes into engagement with the brake drum.

4. For use in cooperation with a rotatable brake drum, a brake comprising a non-rotatable support member, an anchor member carried by said support member having internally threaded openings at opposite ends thereof and having a projection extending from one side thereof, two adjusting screws, each comprising a stem screwed into one side of the anchor member and a head having a flat shoe-engaging surface and a toothed periphery, two brake shoes, each having one end thereof in contact with the flat shoe-engaging surface of one of the adjusting screw heads, a return spring connected in tension between the anchored ends of the shoes and centrally engaging the projection which extends from one side of the anchor member, said projection deflecting the spring to provide a lateral force component acting on the shoes, and means for forcing apart the unanchored ends of the shoes to bring the shoes into engagement with the brake drum.

5. For use in cooperation with a rotatable brake drum, a brake comprising a non-rotatable support member, an anchor member carried by said support member having internally threaded openings at opposite ends thereof, two adjusting screws, each comprising a stem screwed into one side of the anchor member and a head having a flat shoe-engaging surface and a toothed periphery, two brake shoes, each having one end thereof in contact with the flat shoe-engaging surface of one of the adjusting screw heads, a return spring connected in tension between the anchored ends of the shoes and engaging, at spaced points, the toothed peripheries of the adjusting screw heads in order to restrain them from undesired rotation, and means for forcing apart the unanchored ends of the shoes to bring the shoes into engagement with the brake drum.

BRYAN E. HOUSE.

REFERENCES CITED

The following references are of record in the file of this patent:

UNITED STATES PATENTS

| Number | Name | Date |
|---|---|---|
| 1,858,311 | Sneed | May 17, 1932 |
| 1,878,911 | Stoner | Sept. 20, 1932 |
| 1,921,287 | Farkas | Aug. 8, 1933 |
| 2,022,045 | Kohr | Nov. 26, 1935 |
| 2,059,270 | Parker | Nov. 3, 1936 |
| 2,291,012 | Watts | July 28, 1942 |
| 2,381,655 | Edmonds | Aug. 7, 1945 |